:

US006740376B2

(12) United States Patent
Oguro et al.

(10) Patent No.: US 6,740,376 B2
(45) Date of Patent: May 25, 2004

(54) POLYESTER BASED RESIN COMPOSITION AND MOLDED PRODUCT THEREFROM

(75) Inventors: Dai Oguro, Kanagawa (JP); Takeo Hayashi, Kanagawa (JP); Takeshi Hirokane, Kanagawa (JP); Masahiro Kurokawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 28 days.

(21) Appl. No.: 10/153,619

(22) Filed: May 24, 2002

(65) Prior Publication Data

US 2003/0068455 A1 Apr. 10, 2003

(30) Foreign Application Priority Data

May 24, 2001 (JP) ........................ 2001-155720
Aug. 2, 2001 (JP) ........................ 2001-235338

(51) Int. Cl.⁷ .................... C08I 77/00; B29D 22/00; B29D 23/00
(52) U.S. Cl. ............... 428/35.7; 428/220; 525/425
(58) Field of Search .............. 428/35.7, 220; 525/525

(56) References Cited

U.S. PATENT DOCUMENTS

| 2,945,008 A | 7/1960 | Caldwell et al. |
| 4,501,781 A | 2/1985 | Kushida et al. |
| 6,319,575 B1 * | 11/2001 | Takashima et al. ........ 428/35.7 |
| 6,346,307 B1 * | 2/2002 | Al Ghatta et al. ......... 428/35.7 |

FOREIGN PATENT DOCUMENTS

| EP | 0 475 720 | 3/1992 |
| EP | 1 164 155 | 12/2001 |
| JP | 60-241056 | 11/1985 |
| JP | 62-265361 | 11/1987 |

* cited by examiner

*Primary Examiner*—Ana L. Woodward
(74) *Attorney, Agent, or Firm*—Antonelli, Terry, Stout & Kraus, LLP

(57) ABSTRACT

There is disclosed A polyester based resin composition (D) which comprises a polyamide resin (A) and a polyester resin (B), or a polyamide resin (A), a polyester resin (B) and a polyethylene terephthalate resin (C), characterized in that the polyester resin (B) is obtained by polycondensation of a dicarboxylic acid component containing 0.5 to 60 mol % of a dicarboxylic acid having a cyclic acetal skeleton and/or a diol component containing 0.5 to 60 mol % of a diol having a cyclic acetal skeleton, and that the blending proportions of the polyamide resin (A), the polyester resin (B) and the polyethylene terephthalate resin (C) are each in the range of 1 to 99% by weight, 1 to 99% by weight and 0 to 98% by weight, respectively on the basis of total sum weight of the components (A), (B) and (C). There is further disclosed a molded product (film, sheet, thin wall hollow container, etc.). The above polyester based resin composition and a product molded therefrom are each excellent in transparency color tone, gas barrier properties, pinhole resistance and mechanical performance.

18 Claims, No Drawings

POLYESTER BASED RESIN COMPOSITION AND MOLDED PRODUCT THEREFROM

BACKGROUND OF THE INVENTION

1. Field of the Invention

The present invention relates to a polyester based resin composition which comprises a polyester resin obtained by polycondensation of a dicarboxylic acid having a cyclic acetal skeleton or of a diol component containing a diol and having a cyclic acetal skeleton; a polyamide resin; and as the case may be, a polyethylene terephthalate resin, and which is excellent in transparency, gas barrier properties and pinhole resistance. The present invention also relates to a molded product obtained from the polyester based resin composition.

2. Description of the Related Arts

A polyester resin which is typified by a polyethylene terephthalate resin, and in which an aromatic dicarboxylic acid is a principal dicarboxylic acid component, and an aliphatic diol is a principal diol component (hereinafter sometimes referred to as "aromatic polyester based resin") is characterized by being excellent in mechanical performance, melting stability, solvent resistance, perfume preservability, recycling properties and the like. Thus it is widely utilized for packaging materials such as films, sheets and hollow containers. However, since the gas barrier properties thereof for oxygen, carbon dioxide and the like are not always favorable, the utilization thereof is limited in applications which require high gas barrier properties. There are available, as a means for imparting gas barrier properties to an aromatic polyester resin, a means by laminating the resin with a metallic foil such as aluminum foil; a means by coating or laminating the resin with an other resin having a high gas barrier property; a means by depositing aluminum or silicon on the resin; and the like means. However, any of the above-mentioned means involves such a problem as impairing transparency, necessitating an intricate production process, or impairing the mechanical performance.

There is available, as a means for imparting gas barrier properties to an aromatic polyester resin without necessitating an intricate production process, a means by mixing the resin with another resin having high gas barrier properties, which is available from polyamide resins typified by nylon 6 and nylon 66. In particular, excellent gas barrier properties are assured by a polyamide resin which is obtained by polycondensation of meta-xylylenediamine and adipic acid (hereinafter sometimes referred to as "polyamide MXD6"). On the other hand, there is available, as a resin having gas barrier properties other than the polyamide resin, ethylene/vinyl alcohol copolymer resin, which however involves such problems that owing to its poor compatibility with an aromatic polyester resin, the composition of both the resins becomes whitely turbid, impairs stretching properties of the resins just mentioned due to high crystallinity, is inferior in heat stability, and the like.

On the other hand, polyamide MXD6 has high gas barrier properties, has a glass transition temperature, melting point and crystallinity each close to those of the aromatic polyester resin, particularly to polyethylene terephthalate and besides, is excellent in heat stability on melting. Accordingly polyamide MXD6 is easy to melt and mix with the aromatic polyester resin, and is advantageous in that it does not impair the stretching properties or mechanical performance of the aromatic polyester resin, and manifests high gas barrier properties.

However, a resin composition comprising the aromatic polyester resin and the polyamide resin such as polyamide MXD6, which has insufficient transparency, is limited in applications requiring high transparency.

In such circumstances, there are proposed a method in which a mixture comprising the polyamide resin and the polyester resin is incorporated with a tetracarboxylic acid anhydride {Japanese Patent Application Laid-Open No. 272660/1989 (Heisei 1)}; a method in which a compound bearing an epoxy group and an acid anhydride group is employed as one type of compatibilizer for the composition of a thermoplastic polyester resin and a polyamide resin having a meta-xylylene group in its main chain {Japanese Patent Application Published No. 2871/1994 (Heisei 6)}; and a method in which a polycarboxylic acid is blended and melt kneaded with an aromatic polyester resin {Japanese Patent Application Laid-Open No.302952/2000 (Heisei 12)}. Nevertheless, any of the above-mentioned methods necessitates an intricate production process. Further, there is proposed a method by using polyethylene terephthalate (PET) and polymeta-xylyleneadipamide which have a specific relative-viscosity-ratio in a specific range {Japanese Patent Application Laid-Open No. 2800/2001 (Heisei 13)}. However, the method involves such problems as insufficient transparency and hygienic question in the case of using for the purpose of food packaging, and further a problem in that the content inside such a packaging material assumes different aspect from the reality owing to its yellowing and/or pearl-like gloss.

SUMMARY OF THE INVENTION

A general object of the present invention is to eliminate the problems as mentioned hereinbefore, and to provide a polyester resin composition which comprises a polyester resin and a polyamide resin, and which is usable for a film, sheet, thin wall hollow container and the like each being excellent in transparency, gas barrier properties, color tone and pinhole resistance.

Other objects thereof will become obvious from the text of this specification hereinafter disclosed.

As a result of intensive research and investigation made by the present inventors it has been found that there is obtainable a resin composition for use in a film, sheet, thin wall hollow container and the like each being excellent in gas barrier properties, transparency, color tone and pinhole resistance by melt kneading the components composed of a polyester resin and a polyamide resin and, as the case may be, a polyethylene terephthalate resin, with a diol having a cyclic acetal skeleton and/or a polyethylene terephthalate resin. The present invention has been accomplished by the above-mentioned findings and information.

Specifically, the present invention relates to a polyester based resin composition (D) which comprises a polyamide resin (A) and a polyester resin (B), or a polyamide resin (A), a polyester resin (B) and a polyethylene terephthalate resin (C), characterized in that said polyester resin (B) is obtained by polycondensation of a dicarboxylic acid component containing 0.5 to 60 mol % of a dicarboxylic acid having a cyclic acetal skeleton and/or a diol component containing 0.5 to 60 mol % of a diol having a cyclic acetal skeleton, and that the blending proportions of the polyamide resin (A), the polyester resin (B) and the polyethylene terephthlate resin (C) are each in the range of 1 to 99% by weight, 1 to 99% by weight and 0 to 98% by weight, respectively on the basis of total sum weight of the components (A), (B) and (C). The present invention also relates to a molded product obtained from the resin composition.

DESCRIPTION OF THE PREFERRED EMBODIMENTS

The resin composition according to the present invention is the polyester based resin composition which comprises a polyamide resin (A) and a polyester resin (B), and optionally a polyethylene terephthalate resin (C). In the following, specific description will be given of the resins to be employed in the present invention, blending proportions thereof, mixing method and molded products obtained from the foregoing polyester based resin composition.

Polyamide Resin (A)

The polyamide resin (A) is a well known moldable resin which is obtained by polymerizing an amino acid, lactam or diamine and dicarboxylic acid each as a monomer.

The amino acid monomer is specifically exemplified by 6-aminocaproic acid, 11-aminoundecanoic acid, 12-aminododecanoic acid and p-aminomethylbenzoic acid. The lactam is exemplified by ε-caprolactam and ω-laurolactam.

The diamine monomer is exemplified by but not limited to tetra-methylenediamine, hexamethylenediamine, undecamethylenediamine, dodecamethylenediamine, 2,2,4-trimethylhexamethylenediamine, 2,4,4-trimethyl-hexamethylenediamine, 5-methylnonamethylenediamine, meta-xylylene diamine, para-xylylenediamine, 1,3-bis(aminomethyl)cyclohexane, 1,4-bis(aminomethyl)cyclohexane, 1-amino-3-aminomethylhexane, 5,5-trimethyl cyclohexane, bis(4-amino-cyclohexyl)methane, bis(3-methyl-4-aminocyclohexyl)methane, 2,2-bis(4-aminocyclohexyl)propane, bis(aminopropyl)piperazine and aminoethylpiperazine.

The dicarboxylic acid monomer is exemplified by but not limited to succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanedicarboxylic acid, tricyclodecanedicarboxylic acid, pentacyclodecanedicarboxylicacid, isophoronedicarboxylicacid, 2,4,8,10-tetra oxaspiro[5,5]undecane-3,9-bis(2-carboxylethyl), trimellitic acid, trimesic acid, pyromellitic acid, tricarballylic acid, terephthalic acid, isophthalic acid, phthalic acid, 2-methylterephthalic acid, naphthalenedicarboxylic acid, biphenyl dicarboxylic acid, tetralindicarboxylic acid and esterified products thereof.

Specific examples of the polyamide resins obtainable from any of these monomers include polymethaxylylene-adipamide (polyamide MXD6), poly caproamide (nylon 6), polyhexamethyleneadipamide (nylon 66), polyhexa methylenesebacamide (nylon 610), polyundecamethyleneadipamide (nylon 116), polyhexamethylenedodecamide (nylon 612), polyundecaneamide (nylon 11), polydodecaneamide (nylon 12) and copolymer amides thereof. Any of these polyamide resins may be used alone or in combination with at least one other. Among the polyamide resins to be used in the present invention, polyamide MXD6 is particularly preferable.

Polyamide MXD6 has high gas barrier properties, has a glass transition temperature, melting point and crystallinity each close to those of the aromatic polyester resin, particularly to polyethylene terephthalate and besides, is excellent in heat stability on melting. Accordingly polyamide MXD6 is easy to melt and mix with the aromatic polyester resin, and is advantageous in that it does not impair the stretching properties or mechanical performance of the aromatic polyester resin, and manifests high gas barrier properties. It is preferable that the diamine component in polyamide MXD6 contain at least 70 mol % of meta-xylenediamine, and the dicarboxylic acid component therein contain at least 70 mol % of adipic acid. The blending ratio in the polyamide MXD6, when being in the aforesaid range, enables to maintain excellent gas barrier properties and mechanical performance.

The polyamide resins (A) to be used in the present invention have each a relative viscosity (measured by dissolving one gram of polyamide resin in 100 milliliter of 96% sulfuric acid at 25° C.) of 1.83 to 4.20, preferably 2.02 to 4.20, more preferably 2.30 to 4.20. By setting the relative viscosity of the polyamide resin on at least 1.83 at the time of molding the polyester resin based composition according to the present invention into a film, sheet, hollow container or the like, it is made possible to effectively prevent the occurrence of die swell or uneven melting resulting from unstable fluidity of melted resin. In addition, a relative viscosity of the polyamide resin (A) of at least 1.83 enables to improve moldability into a film, sheet, hollow container or the like each comprising the aforesaid composition, elucidate the effect on transparency of molded products and suppress the deterioration in transparency due to whitening in an atmosphere of high humidity.

It is preferable that the polyamide resins (A) to be used in the present invention be dried so as to achieve a moisture of at most 0.15%, preferably at most 0.1%. The polyamide resins can be dried by a previously well known method. The drying methods are exemplified by but not limited to a method in which the moisture in the resin is removed by evacuating a vent hole at the time of melt extruding the polyamide resin with an extruder equipped with a vent, a method in which the polyamide resin is charged in a tumbler (rotary vacuum tank), and is heated to dry the same under reduced pressure at a temperature not higher than the melting point of the resin, and the like method.

Polyester Resin (B)

The content of the diol component or dicarboxylic acid component each having a cyclic acetal skeleton as a starting raw material for the polyester resin (B) to be used in the present invention is at least 0.5 mol %, preferably at least 1 mol %, more preferably at least 2 mol %. By setting the content of such diol component or dicarboxylic acid component in the above-mentioned range, it is possible for the polyester based resin composition according to the present invention to provide molded products such as a film, sheet, hollow container or the like that are excellent in mechanical performance, transparency, color tone and pinhole resistance.

Moreover, the content of the diol component or dicarboxylic acid component each having a cyclic acetal skeleton as a starting raw material for the polyester resin (B) to be used in the present invention is at most 60 mol %, preferably at most 45 mol %, more preferably at most 30 mol %. By setting the content of such diol component or dicarboxylic acid component in the above-mentioned range, the polyester based resin composition according to the present invention is made excellent in moldability, transparency and economical efficiency.

Preferably, the aliphatic diol having a cyclic acetal skeleton as a starting raw material for the present polyester resin (B) is a compound represented by the general formula (1) or (2).

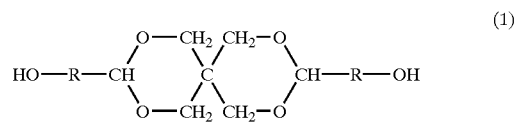
(1)

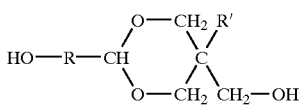
(2)

wherein R and R' are each an organic group selected from the group consisting of an aliphatic group having 1 to 10 carbon atoms, an alicyclic group and an aromatic group.

Examples of the compounds represented by the general formula (1) or (2) include 2,4,8,10-tetraoxaspiro[5,5]undecane-3,9-bis(1,1-dimethyl-2-hydroxy ethyl) and 5-methylol-5-ethyl-2-(1,1-dimethyl-2-hydroxyethyl)-1,3-dioxane.

By using such aliphatic diol having a cyclic acetal skeleton, it is possible for the polyester based resin composition according to the present invention to provide molded products such as a film, sheet, hollow container or the like that are excellent in mechanical performance, transparency, color tone and pinhole resistance.

Preferably, the dicarboxylic acid component having a cyclic acetal skeleton is a compound represented by the general formula (3) or (4).

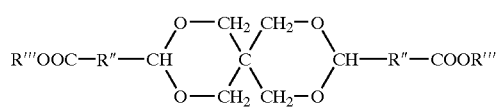
(3)

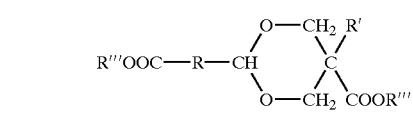
(4)

wherein R, R' and R" are each an organic group selected from the group consisting of an aliphatic group having 1 to 10 carbon atoms, an alicyclic group and an aromatic group, and R'" is H, methyl group, ethyl group or isopropyl group.

Specific examples of the compounds represented by the general formula (3) or (4) include 2,4,8,10-tetraoxaspiro[5,5]undecane-3,9-bis(2-carboxyethyl) and 5-methylol-5-ethyl-2-(1,1-dimethyl-2-carboxyethyl)-1,3-dioxane.

By using such dicarboxylic acid component having a cyclic acetal skeleton, it is possible for the polyester based resin composition according to the present invention to provide molded products such as a film, sheet, hollow container or the like that are excellent in mechanical performance, transparency, color tone and pinhole resistance.

Examples of diols other than those having a cyclic acetal skeleton as a starting raw material to be used in the present polyester resin (B) include ethylene glycol; 1,3-propylenediol; 1,4-butanediol; 1,4-cyclohexanedimethanol; and 1,6-hexanediol.

The above-mentioned working effect is made more remarkable by using a diol monomer component containing ethylene glycol in an amount of 20 to 99.5 mol %, preferably 40 to 99 mol %, more preferably 50 to 99 mol %.

It is possible in the polyester resin (B) to be used in the present invention to use, as a diol component for starting monomer, a monohydric alcohol such as butyl alcohol, hexyl alcohol and octyl alcohol, and polyhydric alcohol such as trimethylolpropane, glycerol and pentaerythritol to the extent that the object of the invention is not impaired thereby.

It is desirable that the dicarboxylic acid component for the polyester resin (B) to be used in the present invention be an aromatic dicarboxylic acid component, which is exemplified by terephthalic acid, isophthalic acid, naphthalenedicarboxylic acid, biphenyldicarboxylic acid and ester-forming derivatives thereof. Of these are preferably used terephthalic acid and ester-forming derivatives thereof.

It is possible in the polyester resin (B) to be used in the present invention to use an aliphatic dicarboxylic acid such as adipic acid and sebacic acid as dicarboxylic acid component, and monocarboxylic acid such as benzoic acid, propionic acid and butyric acid to the extent that the object of the present invention is not impaired thereby. The proportion of the aromatic dicarboxylic acid to the dicarboxylic acid component is at least 70%, preferably at least 80%, particularly preferably at least 90%. By setting the proportion thereof on such level, the polyester resin composition according to the present invention is made more excellent in heat resistance and mechanical performance.

The polyester resin (B) to be used in the present invention may contain, in addition to the aromatic dicarboxylic acid component, a polycarboxylic acid compound wherein at least three carboxylic groups are bonded to an aromatic ring in one molecule or a polycarboxylic acid compound wherein at least two of the carboxylic groups that are bonded to the aforesaid compound form an anhydrous ring. The above-mentioned compounds are exemplified by trimellitic acid, pyromellitic acid, trimellitic anhydride, naphthalenetricarboxylic anhydride wherein carboxylic groups are each bonded to a different position of aromatic rings, various anthracene tricarboxylic acid, various benzophenonetricarboxylic anhydride, benzenetetra carboxylic monoanhydride, various naphthalenetetra-carboxylic dianhydride, various anthracenetetracarboxylic dianhydride, various biphenyltetra carboxylic dianhydride and ethylenebistrimellitic anhydride.

A process for producing the polyester resin (B) according to the present invention is not specifically limited, but may be selected for use from previously well known processes. There are available, for instance, a melt polymerization process and solution polymerization process such as transesterification process and direct esterification process. There are also usable previously well known chemicals including transesterification catalysts, esterification catalysts, etherification inhibitors, polymerization catalysts to be used for polymerization, various stabilizers such as heat stabilizers and light stabilizers and polymerization modifiers. The transesterification catalysts are exemplified by compounds of manganese, cobalt, zinc, titanium and calcium, respectively. The esterification catalysts are exemplified by compounds of manganese, cobalt, zinc, titanium and calcium, respectively. The etherification inhibitors are exemplified by amine compounds.

The polycondensation catalysts are exemplified by compounds of germanium, antimony, tin and titanium, respectively. It is effective to add any of various phosphorus compounds as a heat stabilizer such as phosphoric acid, phosphorous acid or phenylphosphonic acid. The reaction system may be incorporated with a light stabilizer, antistatic agent, lubricant, antioxidant and mold release agent.

It is preferable that the polyester resin (B) to be used in the present invention be dried so as to achieve a moisture of the resin of at most 300 ppm, preferably at most 100 ppm. The intrinsic viscosity (as measured in the mixed solvent of phenol/1,1,2,2-tetrachloroethane having a mass ratio of 60/40 at 25° C.) of the polyester resin to be used in the present invention is not specifically limited, but is desirably in the range of usually 0.3 to 2.0 deciliter (dL)/g, preferably 0.4 to 1.8 dL/g. The intrinsic viscosity thereof, when being at least 0.3 dL/g, results in a sufficiently high molecular weight of the polyester resin, whereby a molded product composed of the polyester based resin (B) composition obtained from the polyester resin is imparted with particularly excellent mechanical performance.

The melt viscosity (as measured at 255° C. and at a shear rate of 100 s$^{-1}$) of the polyester resin (B) to be used in the present invention is in the range of preferably 500 to 5000 Pa·s , more preferably 500 to 2000 Pa·s. The melt viscosity thereof within the aforesaid range leads to particularly excellent moldability for a film, sheet, hollow container or the like.

The molecular weight distribution {ratio of weight average molecular weight (Mw) to number average molecular weight (Mn), namely Mw/Mn} of the polyester resin (B) to be used in the present invention is in the range of preferably 2.3 to 12.0, more preferably 2.5 to 8.0. The molecular weight distribution within the aforesaid range leads to particularly excellent moldability for a film, sheet, hollow container or the like. The molecular weight distribution can be regulated to 2.3 to 12.0 by properly selecting the amount to be used of the dicarboxylic acid or diol component each having a cyclic acetal skeleton, timing of addition, molecular weight of the polyester resin, polymerization temperature and additives.

Polyethylene Terephthalate Resin (C)

Polyethylene terephthalate resin (C) to be used at need in the present invention is a polyester composed of terephthalic acid as the principal acid component and ethylene glycol as the principal glycol component. By the term "principal" as mentioned herein is meant a content or amount exceeding 85 mol %. Hence, ester units other than terephthalic acid and ethylene glycol can be contained in the range of less than 15 mol % . Examples of copolymerizable components include a dicarboxylic acid and diolother than terephthalic acid and ethylene glycol; and an oxyacid. There may be contained therein a polycarboxylic acid compound wherein at least three carboxylic groups are bonded to an aromatic ring in one molecule or a polycarboxylic acid compound wherein at least two of the carboxylic groups that are bonded to the aforesaid compound form an anhydrous ring.

Specific examples of the diol component other than ethylene glycol include aliphatic diols such as trimethylene glycol, 1,4-butanediol, 1,5-pentanediol, 1,6-hexanediol, diethylene glycol, propylene glycol and neopentyl glycol; polyether compounds such as polyethylene glycol, polypropylene glycol and polybutylene glycol; alicyclic diols such as 1,3-cyclohexanedimethanol, 1,4-cyclohexanedimethanol, 1,2-decahydro naphthalenedimethanol, 1,3-decahydronaphthalenedimethanol, 1,4-decahydro naphthalenedimethanol, 1,5-decahydronaphthalenedimethanol, 1,6-decahydro naphthalenedimethanol, 2,7-decahydronaphthalenedimethanol, tetralin dimethanol, norbornanedimethanol, tricyclodecanedimethanol and pentacyclo decanedimethanol; adducts of bisphenol with alkylene oxide such as 4,4'-(1-methylethylidene)bisphenol, methylenebisphenol (bisphenol F), 4,4'-cyclo hexylidenebisphenol (bisphenol Z) and 4,4'-sulfonyl bisphenol (bisphenol S); and adducts of aromatic dihydroxy compound with alkylene oxide such as hydroquinone, resorcin, 4,4'-dihydroxybiphenyl, 4,4'-dihydroxy diphenyl ether and 4,4'-dihydroxydiphenylbenzophenone.

In addition, examples of the dicarboxylic acid component other than the aromatic dicarboxylic acid component include succinic acid, glutaric acid, adipic acid, pimelic acid, suberic acid, azelaic acid, sebacic acid, dodecane dicarboxylic acid, cyclohexanedicarboxylic acid, decalindicarboxylic acid, norbornane dicarboxylic acid, tricyclodecanedicarboxylic acid, pentacyclo decanedicarboxylic acid and isophoronedicarboxylic acid.

Examples of the polycarboxylic acid compounds include trimellitic acid, pyromellitic acid, trimellitic anhydride, naphthalenetricarboxylic anhydride wherein carboxylic groups are bonded to a different position of aromatic rings, various anthracenetricarboxylic acid, various benzophenonetricarboxylic anhydride, benzenetetracarboxylic monoanhydride, various naphthalene tetra carboxylic dianhydride, various anthracenetetracarboxylic dianhydride, various biphenyltetracarboxylic dianhydride and ethylenebistrimellitic anhydride.

Blending Proportion

With regard to the blending proportion in the polyester based resin composition (D) according to the present invention, the composition comprises 1 to 99% by weight of the polyamide resin (A), 1 to 99% by weight of the polyester resin (B) and 0 to 98% by weight of the polyethylene terephthlate resin (C).

In the case where the polyester based resin composition (D) consists essentially of the polyamide resin(A) and the polyester resin (B), the blending proportion of the polyamide resin (A) is preferably 5 to 95%, more preferably 10 to 90% by weight, while the blending proportion of the polyester resin (B) is preferably 5 to 95%, more preferably 10 to 90% by weight. By setting the blending proportions of the polyamide resin (A) and the polyester resin (B) on the above-mentioned range, it is made possible to obtain the polyester based resin composition having respective advantages.

In the case where the polyester based resin composition (D) consists essentially of the polyamide resin (A), the polyester resin (B) and the polyethylene terephthalate resin (C), the blending proportion of the polyamide resin (A) is preferably 1 to 50%, more preferably 5 to 45% by weight. By setting the blending proportion of the polyamide resin (A) on at least 1% by weight, it is made possible to obtain the polyester based resin composition having high gas barrier properties.

In addition, in the case where the polyester based resin composition (D) consists essentially of the polyamide resin (A), the polyester resin (B) and the polyethylene terephthalate resin (C), by setting the blending proportion of the polyamide resin (A) on at most 79% by weight, it is made possible to obtain the polyester based resin composition excellent in transparency and economical efficiency.

In the above-mentioned case, the blending proportion of the polyester resin (B) is at most 79%, preferably at most 45% by weight. By setting the blending proportion of the polyester resin (B) on at most 79% by weight, it is made possible to preserve transparency and thermally fix oriented films at the time of production.

Moreover in the aforesaid case, the blending proportion of the polyethylene terephthalate resin (C) is at least 20%, preferably at least 50% by weight. By setting the blending proportion of the polyethylene terephthlate resin (C) on at least 20% by weight, it is made possible to obtain the polyester based resin composition having high mechanical performance and excellent economical efficiency. Further in the foregoing case, the blending proportion of the polyethylene terephthalate resin (C) is at most 98%, preferably at most 90% by weight. By setting the blending proportion thereof on at most 98% by weight, it is made possible to obtain the polyester based resin composition having high transparency and gas barrier properties.

Mixing Method

Mixing of the resins to be used for the production process of the polyester based resin composition (D) according to the present invention can be carried out by a previously well known method. For instance, the mixing methods are exemplified by dry blending of the polyamide resin (A), polyester resin (B) and polyethylene terephthlate resin (C) by means of a tumbler, V-type blender, Henscel mixer or the like; further melt mixing at least once of the above dry blended mixture by means of a single screw extruder, twin screw extruder, kneader or the like; and when necessary, solid phase polymerization of the above melt mixture under high vacuum or in an atmosphere of an inert gas.

The polyester based resin composition (D) according to the present invention may be prepared by melt kneading the mixture produced by dry blending the polyamide resin (A), the polyester resin (B) and as the case may be, the polyethylene terephthalate resin (C), or by melt kneading the mixture produced by dry blending the polyethylene terephthlate resin (C) with the preliminary kneaded product obtained by melt kneading the polyamide resin (A) and the polyester resin (B).

The polyester based resin composition (D) according to the present invention may be incorporated with an other resin, specifically exemplified by an polyolefin such as polyethylene and polypropylene, various elastomers such as polyolefin elastomer and polyamide elastomer, and an ionomer, and further with a pigment, dye, lubricant, matting agent, heat stabilizer, weather proof stabilizer, ultraviolet absorber, nucleating agent, plasticizer, flame retardant and antistatic agent to the extent that the object of the present invention is not impaired thereby.

In addition, The polyester based resin composition (D) according to the present invention may be incorporated with recovered polyethylene terephthalate product, recovered polyethylene terephthalate product modified with and containing a small amount of isophthalic acid component, recovered polyamide product and/or recovered off-specification resin product of polyester and/or polyamide. Then the gas barrier properties of the resin composition may be improved by adding a mineral clay as montmorillonite or an organic transition metal as cobalt stearate.

Molded Product

As a molded product which is composed of the polyester based resin composition (D) according to the present invention, extruded products and injection molded products are available, which are specifically exemplified by a film and sheet each produced by uniaxially or biaxially orienting the extruded product, a thin wall hollow container produced by subjecting the injection molded product to orientation blowing. That is to say, the polyester based resin composition (D) according to the present invention is usable as a material for packaging molded product which is required to have high transparency, including a non-oriented or low-draw-ratio monolayer sheet and multilayer sheet that are obtained by T die method, coextrusion method or the like; a film and multilayer sheet obtained by orienting the sheet; a film and deeply drawn container obtained by orienting the sheet; and a thin wall hollow container which has a shell wall thickness of 0.1 to 2 mm, and which is obtained by a direct blow molding or an orientation blow molding, leaving non-oriented state even after the molding.

The production of a hollow molded product can be carried out in the same manner as a conventional hollow molding of a polyester resin. For instance, there are available a hot parison process in which a parison is injection molded by extrusion blow molding generally called direct blow molding or molding called injection blow molding, and soon thereafter while the parison is not sufficiently cooled, it is blow molded by means of a compressed gas; a cold parison process in which a parison having a bottom and an opening is prepared by injection molding or extrusion, and thereafter the resultant parison is oriented and controlled to a proper temperature with an orientation blowing apparatus, and is simultaneously or consecutively subjected to biaxial orientation by means of a compressed gas, so that the parison is blow molded.

The polyester based resin composition (D) according to the present invention has favorable moldability into a non-oriented or low-draw-ratio monolayer sheet and multilayer sheet that are obtained by T die method, coextrusion method or the like; a film and multilayer sheet obtained by orienting the sheet; a deeply drawn container with a low draw ratio; a direct-blow molded product and orientation-blow molded product which leave non-oriented state even after the molding. Further it is made possible to impart molded products with excellent transparency, pinhole resistance and whitening resistance, while preserving barrier properties and high color tone of a thin wall hollow container.

Furthermore, the polyester based hollow molded products according to the present invention is favorably usable for food packaging containers, pharmaceutical packaging containers, tanks and vessels for fuel such as gasoline, containers for perfumes, dyes and cosmetics, solvent containers and so forth.

In the following, the present invention will be described more specifically with reference to comparative examples and working examples. The samples {polyamide resin (A) and polyethylene terephthlate resin (C)} and the sample {polyester resin (B)} that were used in the comparative examples and working examples were synthesized and evaluated by the following synthesis method and evaluation method, respectively.

<Sample>

In each of the comparative examples and working examples, use was made, as the polyamide resin (A), of MDX 6 having a relative viscosity of 2.65 (manufactured by Mitsubishi Gas Chemical Co.,Inc. under the trade name "MX nylon 6011", which is hereinafter referred to as "MX nylon"); and also use was made of the polyethylene terephthalate resin (C) having an intrinsic viscosity of 0.80 dL/g (manufactured by Japan Unipet Co.,Ltd. under the trade name "Unipet grade RT 553C ", which is hereinafter referred to as "PET").

<Synthesis Method for Samples>

As the polyester based resin (B), use was made of the polycondensation product derived from the dicarboxylic acid monomer and diol monomer as described in Table 1 through Table 12. The sample {polyester resin (B)} was synthesized by the following reaction composed of two steps.

(1) Transesterification Reaction of DMT (dimethylterephthalate)

The starting raw monomers each in a prescribed amount as described in Table 1 through Table 12 were subjected to transesterification reaction at a temperature elevated up to 200° C. in an atmosphere of nitrogen in the presence of a transesterification catalyst composed of manganese acetate tetrahydrate in an amount of 0.03 mol based on 100 mol of dimethyl terephthalic acid ester (DMT).

(2) Polycondensation Reaction

Subsequently, 100 mol of DMT as obtained in the preceding step was subjected to polycondensation in the presence of a polycondensation catalyst composed of 0.01 mol of antimony oxide (III) and an antioxidant composed of 0.06 mol of triphenyl phosphate (hereinafter referred to as "TPP"), while the reaction temperature was gradually raised and lowered, finally at a temperature of 280° C. and pressure of 0.1 kPs. The reaction was finished when a proper melt viscosity was achieved to obtain polyester resin (B).

<Evaluation Method>

The following is the evaluation method for the resin composition as obtained in the present working examples and comparative examples.

(1) Haze Value (Haze) and Yellowing Index (YI)

Haze and yellowing index were measured in accordance with JIS-K-7105 and ASTM D1003, respectively. The measuring apparatus used was a haze value measuring apparatus manufactured by Japan Denshoku Industries Co.,Ltd. (Model No. COH-300A).

(a) Measurement of haze value for non-oriented sheet: A non-oriented sheet having a thickness of 300 micrometer was subjected to moisture control for 48 hours, and then measured for haze value in an atmosphere of 23° C. and a relative humidity of 50%. The value in the tables is that expressed in terms of 20 micrometer.

(b) Measurement of haze value for oriented sheet: A non-oriented sheet was oriented in both machine and transverse directions each at a draw ratio of 4 and thermally fixed at 220° C. The sheet thus oriented with a thickness of 20 micrometer approx. was subjected to moisture control for 48 hours, and then measured for haze value in an atmosphere of 23° C. and a relative humidity of 50%. The value in the tables is that expressed in terms of 20 micrometer.

(c) Measurement of haze value and yellowing index of bottle: A bottle was prepared form the non-oriented or oriented sheet, and measurements were made of haze value and yellowing index for the same by cutting out the shell portion of the bottle. The measured value in the unit of % is the value in which the thickness was expressed in terms of 300 micrometer.

(2) Oxygen Permeation Coefficient

Oxygen permeation coefficient was measured in accordance with ASTM D3985 under the measuring conditions of 23° C. in temperature and 60% in a relative humidity by the use of the measuring apparatus which was manufactured by Modern Controls Co.,Ltd. (Model No. OX-TRAN 10/50A). The measured values are expressed in the unit of milliliter·mm/m$^2$ ·day·atm.

(3) Impact Punching Test

Impact punching test was carried out in accordance with JIS-P-813 and ASTM D781, respectively under the measuring conditions of 23° C. in temperature and 60% in a relative humidity by the use of a puncture tester as the measuring apparatus which was manufactured by Toyo Seiki Co.,Ltd. The measured values are expressed in the unit of kJ/m.

(4) Pinhole Resistance Test

Pinhole resistance test was carried out by the use of a Gelborflex manufactured by Rigaku Electric Industries Co., Ltd. at 200th, 400th and 800th actions by setting the axis direction as the measuring direction. Pinhole measurement was carried out by the use of a pinhole tester (slight current discharge method)in an atmosphere of 23° C. and a relative humidity of 50%.

In addition, the following symbols were used in each of the tables showing the conditions and performance results in the present working examples and comparative examples, in which the symbol* represents a cyclic acetal skeleton.

PET: polyethylene terephthalate
DMT: dimethylterephthalate
SPD*: 2,4,8,10-tetraoxaspiro[5,5]undecane-3,9-bis(2-carboxyethyl)
DOD: 5-methylol-5-ethyl-2-(1,1-dimethyl-2-carboxyethyl)-1,3-dioxane
EG: ethylene glycol
CHDM: 1,4-cyclohexanedimethanol
SPG*: 2,4,8,10-tetraoxaspiro[5,5]undecane-3,9-bis(1,1-dimethyl-2-hydroxyethyl)
DOG*: 5-methylol-5-ethyl-2-(1,1-dimethyl-2-hydroxyethyl)-1,3-dioxane Examples 1 to 10

Comparative Examples 1 to 6

Prescribed amounts of polyester resin (B) and polyamide resin (PA 1) were mixed by the use of a tumbler. The mixture thus prepared was made into films by means of a twin screw extruder having a screw diameter of 20 mm and a length/diameter ratio of 25 by T die method under the operating conditions including a cylinder temperature in the range of 240 to 260° C., a T die temperature of 280° C., the number of revolutions of screw of 50 rpm and a cooling roll temperature in the range of 70 to 80° C., so that non-oriented sheets having a width of 120 mm and a thickness of about 0.3 mm were obtained. The haze value of the sheets thus obtained is given in Tables 1 to 5. Subsequently, by the use of a twin screw extruder manufactured by Toyo Seiki Co.,Ltd., the foregoing non-oriented sheets were preliminarily heated at 90 to 110° C. for 10 to 30 seconds, and thereafter were simultaneously oriented in both machine and transverse directions each at a draw ratio of 4 at a linear orientation velocity of 30 to 90%. Then the sheets thus oriented were heat treated for 20 seconds in an atmosphere of 235 to 240° C., while the oriented sheets were maintained under a tension condition, so that oriented films with a thickness of 20 micrometer were obtained. The evaluation results are given in Tables 1 to 5.

Examples 11 to 17

Comparative Examples 7 to 8

Prescribed amounts of polyester resin (B), polyamide resin (A) and polyethylene terephthlate resin (C) were mixed by the use of a tumbler. The mixture thus prepared was made into films by means of a twin screw extruder having a screw diameter of 20 mm and a length/diameter ratio of 25 by T die method under the operating conditions including a cylinder temperature in the range of 240 to 260° C., a T die temperature of 260° C., the number of revolutions of screw of 50 rpm and a cooling roll temperature in the range of 70 to 80° C., so that non-oriented sheets having a width of 120 mm and a thickness of about 0.3 mm were obtained. The haze value of the sheets thus obtained is given in Tables 6 to 8. Subsequently, by the use of a twin screw extruder manufactured by Toyo Seiki Co.,Ltd., the foregoing non-oriented sheets were preliminarily heated at 95 to 115° C. for 10 to 30 seconds, and thereafter were simultaneously oriented in both machine and transverse directions each at a draw ratio of 4 at a linear orientation velocity of 30 to 90%. Then the sheets thus oriented were heat treated for 20 seconds in an atmosphere of 235 to 240° C., while the oriented sheets were maintained under a tension condition, so that oriented films with a thickness of 20 micrometer were obtained. The evaluation results are given in Tables 6 to 8.

Examples 18 to 20

Prescribed amounts of polyester resin (B) and polyamide resin (A) were mixed by the use of a tumbler. The mixture thus prepared was made into melt kneaded product in the form of pellet of by means of a twin screw extruder having a screw diameter of 38 mm and a length/diameter ratio of 25 under the operating conditions including a cylinder temperature in the range of 240 to 260° C., the number of revolutions of screw of 200 rpm. Then prescribed amounts of the melt kneaded product thus prepared and polyethylene terephthlate resin (C) were mixed by the use of a tumbler. The mixture thus prepared was made into films by means of a twin screw extruder having a screw diameter of 20 mm and a length/diameter ratio of 25 by T die method under the operating conditions including a cylinder temperature in the range of 240 to 260° C., a T die temperature of 260° C., the number of revolutions of screw of 50 rpm and a cooling roll temperature in the range of 70 to 80° C., so that non-oriented sheets having a width of 120 mm and a thickness of about 0.3 mm were obtained. The haze value of the sheets thus obtained is given in Table 9. Subsequently, by the use of a twin screw extruder manufactured by Toyo Seiki Co.,Ltd., the foregoing non-oriented sheets were preliminarily heated at 95 to 115° C. for 10 to 30 seconds, and thereafter were simultaneously oriented in both machine and transverse directions each at a draw ratio of 4 at a linear orientation velocity of 30 to 90%. Then the sheets thus oriented were heat treated for 20 seconds in an atmosphere of 235 to 240° C., while the oriented sheets were maintained under a tension condition, so that oriented films with a thickness of 20 micrometer were obtained. The evaluation results are given in Table 9.

Examples 21 to 28

Comparative Examples 9 to 11

Prescribed amounts of polyester resin (B), polyamide resin (A) and polyethylene terephthlate resin (C) were mixed by the use of a tumbler. The mixture thus prepared was formed into preforms with a weight of 30 g by means of an injection molding machine (manufactured by Meiki Manufacturing Co.,Ltd., Model No. M-200). Subsequently, the preforms thus prepared were molded into bottles with a volume of 500 milliliter (pressure resistance specification, petaloid bottom type) through blow molding by the use of a blow molding machine (manufactured by Krupp Corpoplast Co., Ltd. in W. G., Model No. LB-01). The measurement results of haze, YI and oxygen permeation coefficient each of the shell portion of the hollow container bottle are given in Tables 10 to 12.

TABLE 1

| No. of Example | Example 1 | Example 2 | Example 3 | Example 4 |
|---|---|---|---|---|
| Resin Composition (% by weight) | | | | |
| Polyamide (A) | 20 | 20 | 20 | 20 |
| Polyester (B) | 80 | 80 | 80 | 80 |
| Composition of Starting Monomer for Polyester (B) | | | | |
| Dicarboxylic acid (mol %) | | | | |
| DMT | 100 | 100 | — | — |
| DMT/SPD | — | — | 90/10 | — |
| DMT/DOD | — | — | — | 90/10 |
| Diol (mol %) | | | | |
| EG | — | — | 100 | 100 |
| SPG/EG | 20/80 | — | — | — |
| DOG/EG | — | 20/80 | — | — |

TABLE 1-continued

| No. of Example | Example 1 | Example 2 | Example 3 | Example 4 |
|---|---|---|---|---|
| Evaluation Result | | | | |
| Haze of non-oriented sheet (%) | 6.2 | 3.6 | 7.8 | 5.0 |
| Haze of oriented film (%) | 2.2 | 1.5 | 2.0 | 2.0 |
| YI | 1.2 | 1.3 | 1.5 | 1.4 |
| Oxygen permeation coefficient | 0.34 | 0.36 | 0.36 | 0.35 |
| Impact punching strength | 53 | 55 | 54 | 55 |
| Pinhole resistance | | | | |
| Number/200 times | 0.0 | 0.0 | 0.3 | 0.0 |
| Number/400 times | 0.0 | 0.0 | 0.7 | 0.3 |
| Number/800 times | 1.5 | 1.0 | 1.0 | 1.0 |

TABLE 2

| No. of Comp/Example | Comp/Ex 1 | Comp/Ex 2 | Comp/Ex 3 |
|---|---|---|---|
| Resin Composition (% by weight) | | | |
| Polyamide (A) | 20 | 20 | 0 |
| Polyester (B) | 80 | 80 | 100 |
| Composition of Starting Monomer for Polyester (B) | | | |
| Dicarboxylic acid (mol %) | | | |
| DMT | 100 | 100 | 100 |
| Diol (mol %) | | | |
| EG | 100 | — | — |
| CHDM/EG | — | 33/67 | — |
| SPG/EG | — | — | 5/95 |
| Evaluation Result | | | |
| Haze of non-oriented sheet (%) | 1.0 | 3.6 | 0.3 |
| Haze of oriented film (%) | 10.0 | 11.0 | 0.2 |
| YI | 3.7 | 3.5 | 1.8 |
| Oxygen permeation coefficient | 0.4 | 0.5 | 2.9 |
| Impact punching strength | 40 | 42 | 39 |
| Pinhole resistance | | | |
| Number/200 times | 2.3 | 0.0 | 0.0 |
| Number/400 times | 7.3 | 0.0 | 0.0 |
| Number/800 times | 8.3 | 1.0 | 1.0 |

{Remarks} Comp: Comparative, Comp/Ex: Comparative Example

TABLE 3

| No. of Example | Example 5 | Example 6 | Example 7 |
|---|---|---|---|
| Resin Composition (% by weight) | | | |
| Polyamide (A) | 20 | 20 | 20 |
| Polyester (B) | 80 | 80 | 80 |
| Composition of Starting Monomer for Polyester (B) | | | |
| Dicarboxylic acid (mol %) | | | |
| DMT | 100 | 100 | 100 |
| Diol (mol %) | | | |
| SPG/EG | 2/98 | 5/95 | 10/90 |
| Evaluation Result | | | |
| Haze of non-oriented sheet (%) | 3.6 | 4.1 | 5.8 |
| Haze of oriented | 2.6 | 1.8 | 1.2 |

TABLE 3-continued

| No. of Example | Example 5 | Example 6 | Example 7 |
|---|---|---|---|
| film (%) | | | |
| YI | 2.5 | 2.2 | 1.4 |
| Oxygen permeation coefficient | 0.30 | 0.28 | 0.30 |
| Impact punching strength | 49 | 59 | 54 |
| Pinhole resistance | | | |
| Number/200 times | 0.0 | 0.0 | 0.3 |
| Number/400 times | 0.0 | 0.5 | 0.7 |
| Number/800 times | 0.3 | 1.5 | 1.5 |

TABLE 4

| No. of Example | Example 8 | Example 9 | Example 10 |
|---|---|---|---|
| Resin Composition (% by weight) | | | |
| Polyamide (A) | 10 | 20 | 40 |
| Polyester (B) | 90 | 80 | 60 |
| Composition of Starting Monomer for Polyester (B) | | | |
| Dicarboxylic acid (mol %) | | | |
| DMT | 100 | 100 | 100 |
| Diol (mol %) | | | |
| SPG/EG | 5/95 | 5/95 | 5/95 |
| Evaluation Result | | | |
| Haze of non-oriented sheet (%) | 3.0 | 4.1 | 9.0 |
| Haze of oriented film (%) | 0.8 | 1.8 | 3.0 |
| YI | 2.0 | 2.2 | 2.4 |
| Oxygen permeation coefficient | 0.65 | 0.28 | 0.10 |
| Impact punching strength | 49 | 59 | 54 |
| Pinhole resistance | | | |
| Number/200 times | 0.0 | 0.0 | 0.3 |
| Number/400 times | 0.0 | 0.0 | 0.7 |
| Number/800 times | 0.3 | 0.3 | 1.0 |

TABLE 5

| No. of Comp/Example | Comp/Ex 4 | Comp/Ex 5 | Comp/Ex 6 |
|---|---|---|---|
| Resin Composition (% by weight) | | | |
| Polyamide (A) | 10 | 40 | 0 |
| Polyester (B) | 90 | 60 | 100 |
| Composition of Starting Monomer for Polyester (B) | | | |
| Dicarboxylic acid (mol %) | | | |
| DMT | 100 | 100 | 100 |
| Diol (mol %) | | | |
| EG | 100 | 100 | 100 |
| Evaluation Result | | | |
| Haze of non-oriented sheet (%) | 0.8 | 2.0 | 0.3 |
| Haze of oriented film (%) | 6.7 | 19.0 | 0.1 |
| YI | 2.5 | 4.2 | 0.9 |
| Oxygen permeation coefficient | 0.8 | 0.2 | 1.9 |
| Impact punching strength | 40 | 50 | 48 |
| Pinhole resistance | | | |
| Number/200 times | 2.3 | 2.0 | 0.3 |
| Number/400 times | 9.0 | 6.9 | 5.3 |
| Number/800 times | 14.0 | 8.0 | 12.7 |

{Remarks} Comp: Comparative, Comp/Ex: Comparative Example

TABLE 6

| No. of Example | Example 11 | Example 12 | Example 13 | Example 14 |
|---|---|---|---|---|
| Resin Composition (% by weight) | | | | |
| Polyamide (A) | 20 | 20 | 20 | 20 |
| Polyester (B) | 20 | 20 | 20 | 20 |
| PET (C) | 60 | 60 | 60 | 60 |
| Composition of Starting Monomer for Polyester (B) | | | | |
| Dicarboxylic acid (mol %) | | | | |
| DMT | 100 | 100 | — | — |
| DMT/SPD | — | — | 90/10 | — |
| DMT/DOD | — | — | — | 90/10 |
| Diol (mol %) | | | | |
| EG | — | — | 100 | 100 |
| SPG/EG | 20/80 | — | — | — |
| DOG/EG | — | 20/80 | — | — |
| Evaluation Result | | | | |
| Haze of NOR sheet (%) | 2.4 | 3.6 | 3.0 | 2.5 |
| Haze of OR film (%) | 2.1 | 1.5 | 2.0 | 2.0 |
| YI | 2.3 | 1.3 | 1.5 | 1.4 |
| Oxygen permeation coefficient | 0.34 | 0.36 | 0.50 | 0.44 |
| Impact punching strength | 53 | 55 | 54 | 55 |
| Pinhole resistance | | | | |
| Number/200 times | 0.0 | 0.0 | 0.3 | 0.0 |
| Number/400 times | 0.0 | 0.0 | 0.7 | 0.3 |
| Number/800 times | 1.5 | 1.0 | 1.0 | 1.0 |

{Remarks} NOR: non-oriented, OR: oriented

TABLE 7

| No. of Comp/Example | Comp/Ex 7 | Comp/Ex 8 |
|---|---|---|
| Resin Composition (% by weight) | | |
| Polyamide (A) | 20 | 20 |
| Polyester (B) | — | 20 |
| PET (C) | 80 | 60 |
| Composition of Starting Monomer for Polyester (B) | | |
| Dicarboxylic acid (mol %) | | |
| DMT | — | 100 |
| Diol (mol %) | | |
| EG | — | — |
| CHDM/EG | — | 33/67 |
| Evaluation Result | | |
| Haze of non-oriented sheet (%) | 1.0 | 6.6 |
| Haze of oriented film (%) | 10.0 | 11.1 |
| YI | 3.7 | 3.5 |
| Oxygen permeation coefficient | 0.4 | 0.5 |
| Impact punching | 40 | 42 |

TABLE 7-continued

| No. of Comp/Example | Comp/Ex 7 | Comp/Ex 8 |
|---|---|---|
| strength | | |
| Pinhole resistance | | |
| Number/200 times | 2.3 | 0.0 |
| Number/400 times | 7.3 | 0.0 |
| Number/800 times | 8.3 | 1.0 |

{Remarks} Comp: Comparative, Comp/Ex: Comparative Example

TABLE 8

| No. of Example | Example 15 | Example 16 | Example 17 |
|---|---|---|---|
| Resin Composition (% by weight) | | | |
| Polyamide (A) | 20 | 20 | 40 |
| Polyester (B) | 10 | 20 | 60 |
| PET (C) | 70 | 60 | 20 |
| Composition of Starting Monomer for Polyester (B) | | | |
| Dicarboxylic acid (mol %) | | | |
| DMT | 100 | 100 | 100 |
| Diol (mol %) | | | |
| SPG/EG | 20/80 | 20/80 | 20/80 |
| Evaluation Result | | | |
| Haze of non-oriented sheet (%) | 2.0 | 2.4 | 3.0 |
| Haze of oriented film (%) | 2.6 | 2.1 | 2.5 |
| YI | 2.5 | 2.3 | 1.8 |
| Oxygen permeation coefficient | 0.30 | 0.34 | 0.30 |
| Impact punching strength | 49 | 53 | 54 |
| Pinhole resistance | | | |
| Number/200 times | 0.0 | 0.0 | 0.3 |
| Number/400 times | 0.0 | 0.5 | 0.7 |
| Number/800 times | 0.3 | 1.5 | 1.5 |

TABLE 9

| No. of Example | Example 18 | Example 19 | Example 20 |
|---|---|---|---|
| Resin Composition (% by weight) | | | |
| Polyamide (A) | 20 | 20 | 20 |
| Polyester (B) | 10 | 20 | 60 |
| PET (C) | 70 | 60 | 20 |
| Composition of Starting Monomer for Polyester (B) | | | |
| Dicarboxylic acid (mol %) | | | |
| DMT | 100 | 100 | 100 |
| Diol (mol %) | | | |
| SPG/EG | 20/80 | 20/80 | 20/80 |
| Evaluation Result | | | |
| Haze of non-oriented sheet (%) | 3.0 | 3.4 | 3.0 |
| Haze of oriented film (%) | 3.0 | 3.5 | 3.5 |
| YI | 2.5 | 2.3 | 2.4 |
| Oxygen permeation coefficient | 0.32 | 0.38 | 0.35 |
| Impact punching strength | 49 | 53 | 54 |
| Pinhole resistance | | | |
| Number/200 times | 0.0 | 0.0 | 0.3 |
| Number/400 times | 0.0 | 0.5 | 0.7 |
| Number/800 times | 0.3 | 1.5 | 1.5 |

TABLE 10

| No. of Example | Example 21 | Example 22 | Example 23 | Example 24 |
|---|---|---|---|---|
| Resin Composition (% by weight) | | | | |
| Polyamide (A) | 5 | 5 | 10 | 5 |
| Polyester (B) | 95 | 24 | 23 | 24 |
| Pet (C) | — | 71 | 67 | 71 |
| Composition of Starting Monomer for Polyester (B) | | | | |
| Dicarboxylic acid (mol %) | | | | |
| DMT | 100 | 100 | 100 | 100 |
| Diol (mol %) | | | | |
| EG | 95 | 80 | 80 | 80 |
| SPG | 5 | 20 | 20 | — |
| DOG | — | — | — | 20 |
| Evaluation Result of Hollow Container | | | | |
| Haze of bottle shell portion (%) | 5.5 | 6.5 | 6.5 | 6.2 |
| YI of bottle shell portion (%) | 3.4 | 6.1 | 7.0 | 6.0 |
| Oxygen permeation coefficient | 0.94 | 1.1 | 0.68 | 1.1 |

TABLE 11

| No. of Example | Example 25 | Example 26 | Example 27 | Example 28 |
|---|---|---|---|---|
| Resin Composition (% by weight) | | | | |
| Polyamide (A) | 5 | 5 | 10 | 10 |
| Polyester (B) | 95 | 24 | 23 | 23 |
| PET (C) | — | 71 | 67 | 67 |
| Composition of Starting Monomer for Polyester (B) | | | | |
| Dicarboxylic acid (mol %) | | | | |
| DMT | 95 | 80 | 80 | 80 |
| SPD | 5 | 20 | 20 | — |
| DOD | — | — | — | 20 |
| Diol (mol %) | | | | |
| EG | 100 | 100 | 100 | 100 |
| Evaluation Result of Hollow Container | | | | |
| Haze of bottle shell portion (%) | 5.7 | 6.3 | 6.1 | 6.2 |
| YI of bottle shell portion (%) | 3.7 | 6.0 | 5.7 | 6.3 |

TABLE 11-continued

| No. of Example | Example 25 | Example 26 | Example 27 | Example 28 |
|---|---|---|---|---|
| Oxygen permeation coefficient | 1.1 | 1.1 | 0.78 | 0.69 |

TABLE 12

| No. of Comp/Example | Comp/Ex 9 | Comp/Ex 10 | Comp/Ex 11 |
|---|---|---|---|
| Resin Composition (% by weight) | | | |
| Polyamide (A) | 5 | 10 | 0 |
| PET (C) | 95 | 90 | 100 |
| Evaluation Result of Hollow Container | | | |
| Haze of bottle shell portion (%) | 7.1 | 11.3 | 0.5 |
| YI of bottle shell portion (%) | 9.7 | 15.6 | 1.6 |
| Oxygen permeation coefficient | 1.2 | 1.0 | 1.6 |

What is claimed is:

1. A polyester based resin composition (D) which comprises a polyamide resin (A) and a polyester resin (B), or a polyamide resin (A), a polyester resin (B) and a polyethylene terephthalate resin (C), characterized in that said polyester resin (B) is obtained by polycondensation of a dicarboxylic acid component, the dicarboxylic acid component comprising at least one of a dicarboxylic acid and an ester forming derivative thereof, and containing 0.5 to 60 mol % of at least one of a dicarboxylic acid and an ester forming derivative thereof having a cyclic acetal skeleton and/or a diol component containing 0.5 to 60 mol % of a diol having a cyclic acetal skeleton, and that the blending proportions of the polyamide resin (A), the polyester resin (B) and the polyethylene terephthalate resin (C) are each in the range of 1 to 99% by weight, 1 to 99% by weight and 0 to 98% by weight, respectively on the basis of total sum weight of the components (A), (B) and (C).

2. The polyester based resin composition according to claim 1, wherein the polyamide resin (A) is obtained by polycondensation of a diamine component which contains at least 70 mol % of meta-xylylenediamine, and a dicarboxylic acid component which contains at least 70 mol % of adipic acid.

3. The polyester based resin composition according to claim 1, wherein the polyester resin (B) is obtained by polymerization of a dicarboxylic acid component which contains at least 70 mol % of an aromatic dicarboxylic acid or an ester forming derivative thereof.

4. The polyester based resin composition according to claim 3, wherein the aromatic dicarboxylic acid is terephthalic acid or an ester thereof.

5. The polyester based resin composition according to claim 1, wherein the diol having a cyclic acetal skeleton is a compound represented by the formula (1) and/or the formula (2):

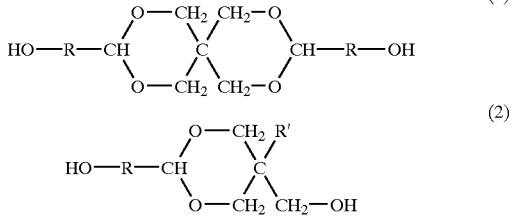

wherein R and R' are each an organic group selected from the group consisting of an aliphatic group having 1 to 10 carbon atoms, an alicyclic group and an aromatic group.

6. The polyester based resin composition according to claim 5, wherein the diol having a cyclic acetal skeleton is 2,4,8,10-tetraoxaspiro[5,5]undecane-3,9-bis(1,1-dimethyl-2-hydroxyethyl) and/or 5-methylol-5-ethyl-2-(1,1-dimethyl-2-hydroxyethyl)-1,3-dioxane.

7. The polyester based resin composition according to claim 1, wherein the dicarboxylic acid component having a cyclic acetal skeleton is a compound represented by the formula (3) and/or the formula (4):

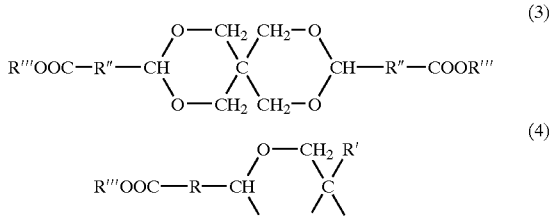

wherein R, R' and R" are each an organic group selected from the group consisting of an aliphatic group having 1 to 10 carbon atoms, an alicyclic group and an aromatic group; and R''' is a methyl group, an ethyl group or an isopropyl group.

8. The polyester based resin composition according to claim 7, wherein the dicarboxylic acid component having a cyclic acetal skeleton is 2,4,8,10-tetraoxaspiro[5,5] undecane-3,9-bis(2-carboxyethyl) and/or 5-methylol-5-ethyl-2-(1,1-dimethyl-2-carboxyethyl)-1,3-dioxane.

9. The polyester based resin composition according to claim 1, wherein the polyester resin (B) is obtained by polymerization of a dicarboxylic acid component which contains 1 to 20 mol % of a dicarboxylic acid having a cyclic acetal skeleton and/or a diol component which contains 1 to 20 mol % of a diol having a cyclic acetal skeleton.

10. The polyester based resin composition according to claim 1, wherein the polyester based resin composition (D) comprises each of the components in such proportions as the polyamide resin (A) in the range of 1 to 50% by weight, the polyester resin (B) in the range of 1 to 79% by weight and polyethylene terephthalate resin (C) in the range of 20 to 98% by weight.

11. The polyester based resin composition according to claim 10, wherein the polyester based resin composition (D) comprises each of the components in such proportions as the polyamide resin (A) in the range of 5 to 45% by weight, the polyester resin (B) in the range of 5 to 45% by weight and polyethylene terephthalate resin (C) in the range of 50 to 90% by weight.

12. The polyester based resin composition according to claim 1, wherein the polyester based resin composition (D) comprises each of the components in such proportions as the polyamide resin (A) in the range of 5 to 95% by weight, the polyester resin (B) in the range of 5 to 95% by weight and polyethylene terephthalate resin (C) 0% by weight.

13. The polyester based resin composition according to claim 1, which is the melt kneaded product from the dry blended mixture of the polyamide resin (A) and the polyester resin (B), or the dry blended mixture of the polyamide resin (A), the polyester resin (B) and the polyethylene terephthalate resin (C).

14. The polyester based resin composition according to claim 1, which is a melt kneaded product from the dry blended mixture of the preliminarily kneaded product of the polyamide resin (A) and the polyester resin (B), and the polyethylene terephthalate resin (C).

15. An extrusion molded product which comprises the polyester based resin composition as set forth in claim 1.

16. A polyester based film which is produced by uniaxially or biaxially orienting the extrusion molded product as set forth in claim 15.

17. An injection molded product which comprises the polyester based resin composition as set forth in claims 1.

18. A polyester based hollow molded product which is produced by subjecting the injection molded product as set forth in claim 17, to orientation blowing.

* * * * *